(12) United States Patent
Yun et al.

(10) Patent No.: US 11,330,423 B2
(45) Date of Patent: May 10, 2022

(54) DEVICE AND METHOD FOR MULTI-SIM WIRELESS COMMUNICATION

(71) Applicant: SAMSUNG ELECTRONICS CO., LTD., Suwon-si (KR)

(72) Inventors: Chang-hyun Yun, Suwon-si (KR); Kang-gyu Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 300 days.

(21) Appl. No.: 16/454,379

(22) Filed: Jun. 27, 2019

(65) Prior Publication Data

US 2020/0128391 A1 Apr. 23, 2020

(30) Foreign Application Priority Data

Oct. 17, 2018 (KR) .................. 10-2018-0123929

(51) Int. Cl.
  *H04W 8/18* (2009.01)
  *H04W 76/28* (2018.01)
  *H04W 68/00* (2009.01)
  *H04W 72/04* (2009.01)
  *H04W 74/08* (2009.01)

(52) U.S. Cl.
  CPC ......... *H04W 8/186* (2013.01); *H04W 68/005* (2013.01); *H04W 72/048* (2013.01); *H04W 72/0453* (2013.01); *H04W 74/0808* (2013.01); *H04W 76/28* (2018.02)

(58) Field of Classification Search
  None
  See application file for complete search history.

(56) References Cited

U.S. PATENT DOCUMENTS

| | | |
|---|---|---|
| 8,630,237 B2 | 1/2014 | Hou |
| 8,880,106 B2 | 11/2014 | Dhanda et al. |
| 9,294,141 B2 | 3/2016 | Challa et al. |

(Continued)

FOREIGN PATENT DOCUMENTS

| | | |
|---|---|---|
| EP | 3344000 | 7/2018 |
| WO | 2017124327 | 7/2017 |

OTHER PUBLICATIONS

European Search Report dated Nov. 27, 2019 in corresponding European Application No. 19184040.4 (10 pages).

*Primary Examiner* — Faruk Hamza
*Assistant Examiner* — Alan L Lindenbaum
(74) *Attorney, Agent, or Firm* — F. Chau & Associates, LLC

(57) ABSTRACT

Disclosed are methods and devices for multi-Subscriber Identify Module (SIM) wireless communication. In an embodiment, a method includes establishing a window for at least receiving paging in an idle state of a first wireless communication associated with a first SIM. A prediction is made, based on the window, of a collision or non-collision between the paging and a second wireless communication associated with a second SIM. It is then determined, in response to a collision prediction, whether a simultaneous reception of the paging and the second wireless communication is possible through use of different respective carriers, if so, respective radio frequency (RF) paths are allocated to the paging and the second wireless communication, where the allocated RF paths correspond to the different respective carriers.

19 Claims, 14 Drawing Sheets

(56) References Cited

U.S. PATENT DOCUMENTS

| | | | |
|---|---|---|---|
| 9,674,758 B2 | 6/2017 | Tsai et al. | |
| 2013/0150095 A1* | 6/2013 | Mehio | H04W 8/183 |
| | | | 455/458 |
| 2015/0038154 A1 | 2/2015 | Ponukumati et al. | |
| 2015/0163827 A1* | 6/2015 | Ekici | H04W 68/02 |
| | | | 370/338 |
| 2016/0183238 A1* | 6/2016 | Buthler | H04L 1/1887 |
| | | | 370/329 |
| 2017/0280507 A1 | 9/2017 | Wang | |
| 2017/0295513 A1 | 10/2017 | Lee et al. | |
| 2017/0359772 A1 | 12/2017 | Lee | |
| 2018/0020464 A1 | 1/2018 | Liang et al. | |
| 2018/0368099 A1* | 12/2018 | Chen | H04W 48/18 |

\* cited by examiner

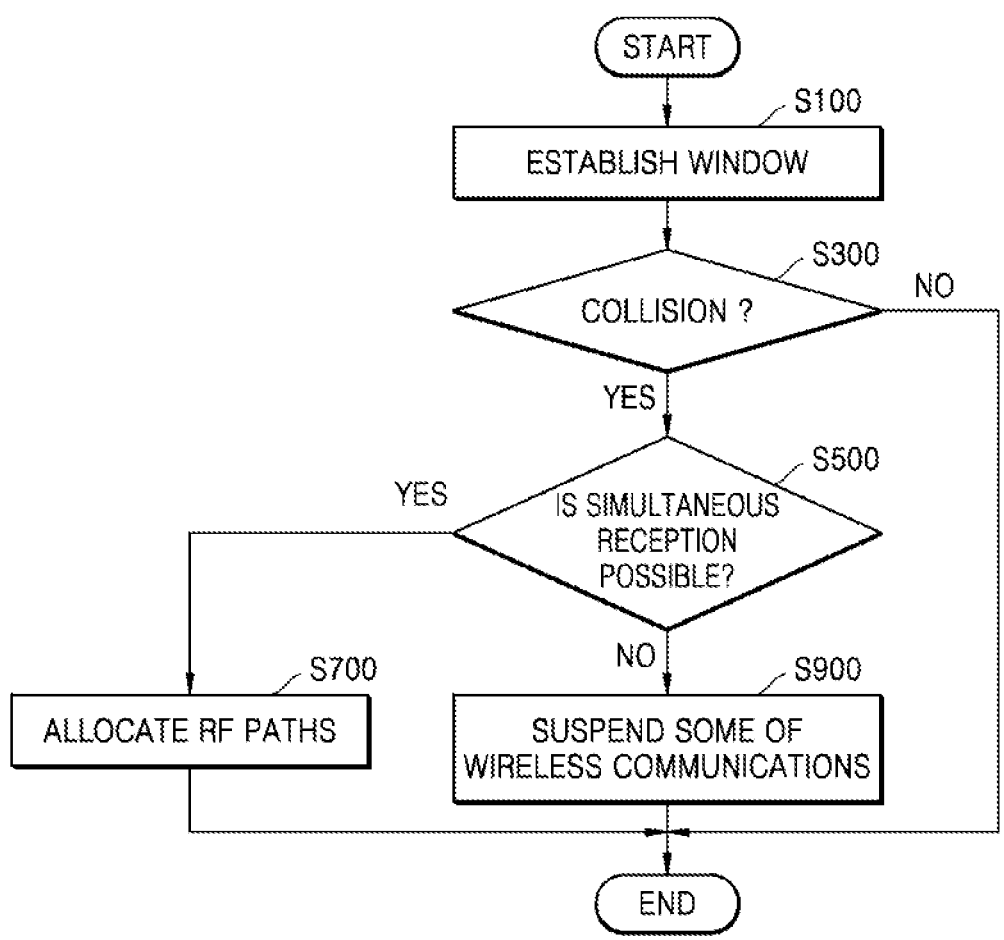

DEVICE AND METHOD FOR MULTI-SIM WIRELESS COMMUNICATION

CROSS-REFERENCE TO RELATED APPLICATION

This application claims the benefit of Korean Patent Application No. 10-2018-0123929, filed on Oct. 17, 2018, in the Korean Intellectual Property Office, the disclosure of which is incorporated herein by reference in its entirety.

TECHNICAL FIELD

This disclosure relates generally to wireless communication, and more particularly, to a method and device for multi-Subscriber Identify Module (SIM) wireless communication.

DISCUSSION OF THE RELATED ART

Wireless communication using multi-SIM may enable a wireless terminal to connect two different network services. For example, the terminal may include a plurality of SIMs, e.g., by means of a plurality of SIM cards inserted therein, where the plurality of SIMs may respectively correspond to different subscribers and/or telephone numbers. The terminal may implement a plurality of protocol stacks to drive a plurality of wireless communications corresponding to the plurality of SIMs. When the plurality of protocol stacks in the terminal mutually exclusively use a radio frequency (RF) resource, wireless communication derived by some of the protocol stacks may be inevitably suspended. For instance, during a voice or data call associated with a first SIM, it may be desirable to periodically listen for an incoming page associated with a second SIM. However, this often results in the ongoing call becoming periodically suspended to handle the page, resulting in possible degradation of communication quality or loss of information.

SUMMARY

Embodiments of the inventive concept provide a device and a method of simultaneous reception in multi-Subscriber Identify Module (SIM) wireless communication.

According to an aspect of the inventive concept, there is provided a method of multi-Subscriber Identify Module (SIM) wireless communication, the method including: establishing a window for at least receiving paging in an idle state of a first wireless communication associated with a first SIM. A prediction is made, based on the window, of a collision or non-collision between the paging and a second wireless communication associated with a second SIM. It is then determined, in response to a collision prediction, whether a simultaneous reception of the paging and the second wireless communication is possible through use of different respective carrier waves, and if so, respective radio frequency (RF) paths are allocated to the paging and the second wireless communication, where the allocated RF paths correspond to the different respective carrier waves.

According to an aspect of the inventive concept, there is provided a method of multi-Subscriber Identify Module (SIM) wireless communication, the method including: obtaining radio frequency (RF) resource information regarding configurations of carrier aggregation and/or multi-connectivity; determining, based on the RF resource information, whether a simultaneous reception of a paging of a first wireless communication associated with a first SIM, and, a second wireless communication associated with a second SIM is possible; if so, allocating respective RF paths to the paging and the second wireless communication, where the allocated RF paths correspond to different carrier waves.

According to an aspect of the inventive concept, there is provided a Multi-SIM Multi-Standby (MSMS) device including a memory, and at least one processor configured to perform either of the above-summarized multi-Subscriber Identify Module (SIM) wireless communication methods by executing instructions stored in the memory.

According to an aspect of the inventive concept, there is provided a user equipment supporting an MSMS device, the user equipment including a first Subscriber Identify Module (SIM), a second SIM, a transceiver generating a plurality of radio frequency paths corresponding to a plurality of carriers, and a multi-SIM device connected to the transceiver, the first SIM, and the second SIM. The multi-SIM device may include a processor configured to execute instructions to determine whether a simultaneous reception of a first paging of a first wireless communication associated with the first SIM, and, a second wireless communication associated with the second SIM is possible through use of different respective ones of the carrier waves; and allocate, in response to a determination that the simultaneous reception is possible, at least one RF path from among the plurality of RF paths to each of the first paging and the second wireless communication.

BRIEF DESCRIPTION OF THE DRAWINGS

Embodiments of the inventive concept will be more clearly understood from the following detailed description taken in conjunction with the accompanying drawings in which like reference characters denote like elements, features or operations, wherein:

FIG. 4 is a flowchart illustrating a method of the multi-SIM wireless communication according to an example embodiment of the inventive concept;

DETAILED DESCRIPTION OF EMBODIMENTS

Herein, the term "paging", when used as a noun, refers to paging signals such as a paging message or paging beacon.

Herein, the terms "transmit" and "receive" may be used as adjectives to mean transmission and reception, respectively. For example, a "receive signal" refers to a reception signal; the phrase "receive path" means a path for handling receive signals; and so on.

Herein, the terms "cell" and "base station" may be used synonymously.

Herein, the term "carrier" refers to a "carrier wave" unless the context indicates otherwise.

Figure 1:
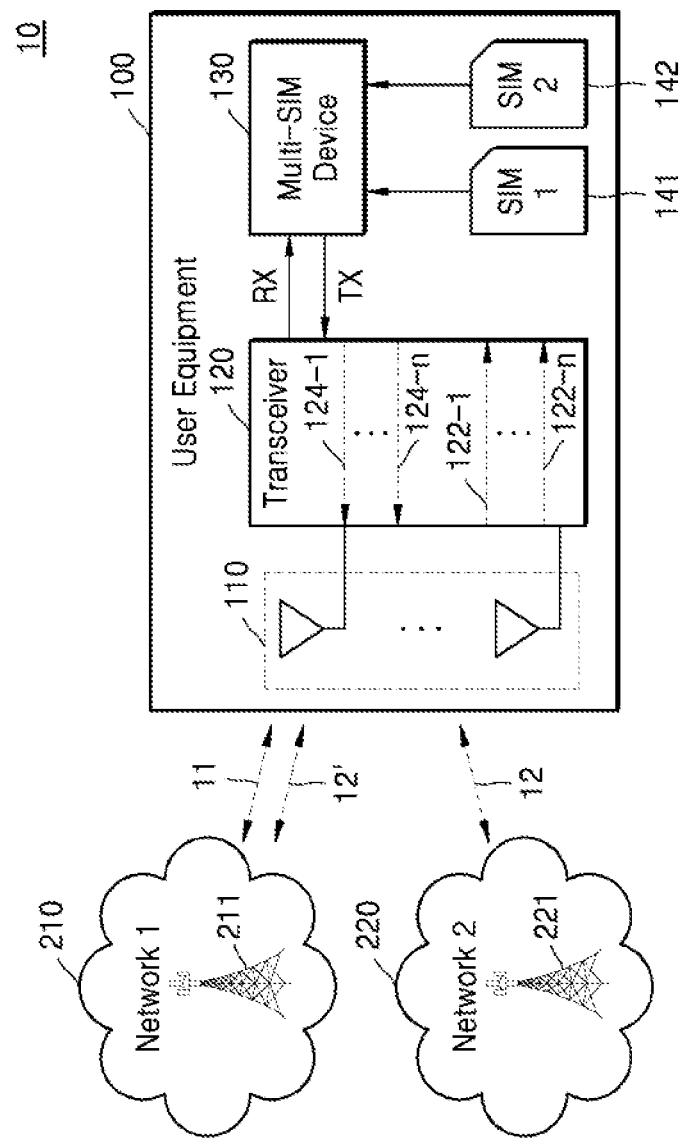
FIG. 1 is a block diagram illustrating a wireless communication system according to an example embodiment of the inventive concept.

FIG. 1 is a block diagram illustrating a wireless communication system 10 according to an example embodiment of the inventive concept. As shown in FIG. 1, the wireless communication system 10 may include a first network 210, a second network 220, and user equipment 100. The first and second networks 210, 220 may include first and second base stations (BSs) 211, 221, respectively.

The user equipment (UE) 100, which is a wireless communication device, may be a fixed or mobile device that transmits/receives data and/or control information by performing wireless communication with a base station (e.g., BS 211/221). For example, the UE 100 may be referred to as a terminal, a terminal equipment, a mobile station (MS), a mobile terminal (MT), a user terminal (UT), a subscriber station (SS), a wireless device, a handheld device, and the like. As shown in FIG. 1, the UE 100 may include an antenna array 110, a transceiver 120, a multi-SIM device 130, a first SIM 141, and a second SIM 142.

The base station 211/221 may be a fixed or mobile station communicating with the UE 100 and/or other base stations and may exchange data and control information by communication with the UE 100 and/or the other base stations. For example, the base station 211 or 221 may be referred to or configured as a Node B, evolved Node B (eNB), next generation Node B (gNB), a sector, a site, a base transceiver system (BTS), access point (AP), relay node, a remote radio head (RRH), a radio unit (RU), a "cell", a small cell, and the like. Herein, the terms "base station" or "cell" may be used generally to indicate a portion of region or function covered by Base Station Controller (BSC) in CDMA, Node-B in WCDMA, eNB in LTE, gNB or a sector (a site) in 5G NR, and may include various coverage areas such as megacell, macrocell, microcell, picocell, femtocell, relay node, RRH, RU, and a small cell communication range.

The UE 100, which may connect to the first network 210 through the first base station 211 to form a first wireless communication 11, where the term "wireless communication" may be interchangeably referred to herein as a wireless connection, a communication link, a subscription, or the like. UE 100 may also connect to the second network 220 through the second base station 221 to form a second wireless communication 12. The UE 100 may communicate with the first network 210 and the second network 220 according to a suitable radio access technology (RAT). For example, the UE 100 may, as non-limited examples, communicate with the first network 210 and the second network 220 according to a 5th Generation (5G) system, a 5G New Radio (5G NR) system, a Long Term Evolution (LTE) system, a Code Division Multiple Access (CDMA) system, a Global System for Mobile Communications (GSM), a Wireless Local Area Network (WLAN) system or other suitable RAT. The UE 100 may, in some embodiments, communicate with the first network 210 and the second network 220 according to the same RAT; alternatively, the UE 100 may, in other embodiments, communicate with the first network 210 and the second network 220 according to different RATs.

The UE 100 may support multi-SIM wireless communications. For example, as shown in FIG. 1, the UE 100 may transmit/receive the first wireless communication 11, which is associated with the first SIM 141, with the first BS 211 and transmit/receive the second wireless communication 12, which is associated with the second SIM 142, with the second BS 221. More particularly, when handling two wireless communications associated with the above-mentioned two SIMS 141 and 142, the UE 100 may be referred to as a dual SIM device. The first wireless communication 11 and the second wireless communication 12 may respectively be referred to as a first connection and a second connection, or alternatively, as a first subscription and a second subscription. In addition, example embodiments of the inventive concept will be described mainly with reference to the dual SIM wireless communication (that is, the above-mentioned two SIMS 141 and 142). However, it will be understood that example embodiments of the inventive concept may also be applied to a multi-SIM wireless communication including at least three SIMs. It is also noted here that the first and second wireless communications 11, 12 may alternatively be established between the UE 100 and the same base station. This is denoted in FIG. 1 by a wireless communication 12', which is a link to the same BS 210 as the wireless communication 11, and which may be substituted for the second wireless communication 12.

The UE 100 may support Multi-SIM Multi-Standby (MSMS). With MSMS, a radio frequency (RF) resource in the UE 100, e.g. the transceiver 120 or a portion thereof, may be shared by the first SIM 141 and the second SIM 142. Accordingly, as will be described later with reference to FIGS. 3A through 3C, in a UE that utilizes a conventional MSMS system, when the first wireless communication 11 and the second wireless communication 12 mutually exclusively use the transceiver, one of the first wireless communication 11 and the second wireless communication 12 may be suspended. For example, when the first wireless communication 11 is in the idle state, the first base station 211 may periodically transmit paging ("first paging") associated with the wireless communication 11. (Such paging, which is related to Mobile Terminated (MT) call, may have a high priority. As will be exemplified later, if a collision is predicted to occur between a first communication of signals with a high priority and a second communication of signals with a lower priority, and if no mechanism for simultaneous reception of the first and second communications is provided, the first communication may be permitted to occur whereas the second communication may be permitted to be suspended during the time of the collision.

Hereafter, the terms "first paging" and "second paging" will be used to denote paging of the first and second wireless communications 11 and 12, respectively. In a conventional UE communicating with the first or second network 210/220, to efficiently receive and process the first paging, the second wireless communication in a UE is suspended, causing the communication efficiency between a UE and the second network 220 to decrease. Furthermore, the second network 220 (or the second base station) may consider that the suspension of the second wireless communication occurs due to an unsatisfactory channel state of the second wireless communication. As a result, the communication efficiency between the UE and the second network 220 may be significantly decreased. In addition, when the second wireless communication is also in the idle state, only one of the paging between the first paging and the second paging received from the second base station 211 may be efficiently received. These drawbacks may be obviated by the UE 100 according to an embodiment of the inventive concept, which, as described hereafter, may enable simultaneous reception of the first and second wireless communication 11, 12 without additional hardware, that is, without modifying the transceiver 120 with additional hardware to avoid such suspension of communication. As a result, signaling from the first network 210 and the second network 220 will not be lost and, at the same time, the communication efficiency with both the first network 210 and the second network 220 may be enhanced.

The antenna array 110 may be an antenna for receiving RF signals from the first base station 211 and the second base station 221. Antenna array 110 may also serve as a transmitting antenna to transmit RF signals to the first base station 211 and the second base station 221. In some embodiments, the antenna array 110 may include a plurality of antennas for Multi-Input Multi-Output (MIMO).

The transceiver 120, which is hardware coupled to the antenna array 110 and the multi-SIM device 130, may provide an RF source for wireless communication. For example, the transceiver 120 may provide a receive signal RX to the multi-SIM device 130 as a baseband signal by processing an RF signal received from the antenna array 110 or provide the RF signal to the antenna array 110 by processing a transmit signal TX as a baseband signal. The transceiver 120 may be controlled by the multi-SIM device 130 and may, as non-limited examples, include switches, matching circuits, filters, amplifiers, mixers, and the like.

In some embodiments, the transceiver 120 may support Carrier Aggregation (CA) in which a plurality of carriers are used. For example, the UE 100 may transmit data to the first base station 211 and/or the second base station 221, by simultaneously using at least two carriers each referred to as component carrier (CC). The transceiver 120 may form RF paths 122-1 to 122-n corresponding to the CCs used in CA and process signals transmitted and received via the RF paths. For instance, the transceiver 120 may include "n" receive paths, 122-1 to 122-n, respectively corresponding to $1^{st}$ through $n^{th}$ CCs, where n is an integer of two or more. Each of the receive paths 122-1 to 122-n may include a low noise amplifier and other components. Each of the receive paths 122-1 to 122-n may be dedicated to receiving signals associated in a frequency band centered around its corresponding CC on receive. Similarly, the transceiver may include n transmit paths 124-1 to 124-n, each corresponding to a respective CC on transmit. It should be noted that some or all of the receive paths may share circuitry and partial-paths in some embodiments. For instance, a first receive path 122-1 and a second receive path 122-n may utilize the same low noise amplifier but may have a respective sub-path for a band pass filter to filter out frequencies outside the band associated with the corresponding CC of that path.

In some embodiments, the transceiver 120 may support Multi-Connectivity (MC), thereby forming a plurality of RF paths being mutually independent from one another. Herein, MC refers to a technique by which data of a communication with a UE may be aggregated among different base stations and/or networks. For instance, using MC, a first portion of the data of a communication, such as a voice or data call, may be exchanged with a first base station, and a second portion of the data of that communication may be exchanged with a second base station, where the first and second portions of the data may or may not include overlapping data. The UE may then combine data received from the two base stations. With MC, a first frequency band used to communicate data with a first base station may differ significantly from a second frequency band used to communicate data with a second base station. In an example, a first base station may use a frequency band below 6 GHz to communicate data of the first portion of the communication session, while a second base station may use a frequency band in the mm-wave range, e.g., above 30 GHz, to communicate the second portion of the data. In general, the frequency band used by the second base station may be at least three times as high as the frequency band used by the first base station to communicate the data of a common communication. In the context of MC, when the transceiver 120 forms only two RF paths independent from each other, the transceiver 120 may be considered as supporting Dual Connectivity (DC). As described above, the transceiver 120 may provide the RF paths, e.g., the paths 122-1 to 122-n on receive, as the RF resource.

The multi-SIM device 130 may communicate with the transceiver 120 by using the baseband signals RX and TX and may be coupled to the first SIM 141 and the second SIM 142. The first SIM 141 may include information for connecting the first network 210 through the first wireless communication 11 and the second SIM 142 may include information for connecting the second network 220 through the second wireless communication 12. As will be described with reference to FIG. 2, the multi-SIM device 130 may have a structure for processing a connection associated with the first SIM 141 and a connection associated with the second SIM 142. In addition, as will be described with reference to FIG. 4, etc., the multi-SIM device 130 may determine whether the first wireless communication 11 and the second wireless communication 12 can be simultaneously received, based on hardware configuration, that is, the RF resources provided by the transceiver 120. When determining that simultaneous reception is possible, the multi-SIM device 130 may allocate at least one RF path to each of the first wireless communication 11 and the second wireless communication 12 by controlling the transceiver 120. For instance, a first RF path 122-1, may be allocated to the first wireless communication 11 and a second RF path, 122-n, may be allocated to the second wireless communication 12 (where n may equal 2). In some embodiments, the multi-SIM device 130 may include a hardware block designed by logic synthesis, a processing unit that includes a software block including a series of instructions and at least one processor executing the instructions, or combinations thereof. In some embodiments, the multi-SIM device 130 may also be referred to as a modem, a communication processor or a baseband processor.

Figure 2:
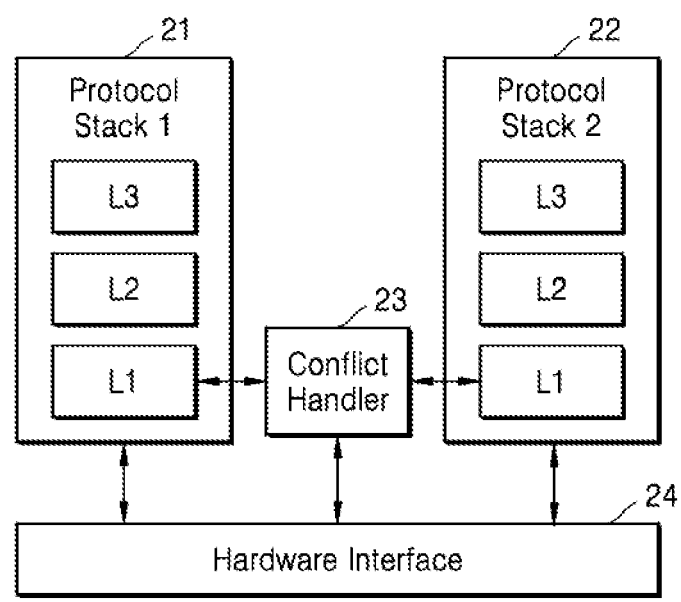
FIG. 2 is a block diagram illustrating a protocol stack system according to an example embodiment of the inventive concept.

FIG. 2 is a block diagram illustrating a protocol stack system 20 according to an example embodiment of the inventive concept. More particularly, FIG. 2 illustrates a control plane of a first protocol stack 21 and a second protocol stack 22 included in the protocol stack system 20. In some embodiments, the protocol stack system 20 shown in FIG. 2 may be implemented in the multi-SIM device 130 shown in FIG. 1 and the multi-SIM device 130 may perform operations for the wireless communication by using the protocol stack system 20 of FIG. 2. At least some of the blocks shown in FIG. 2 may be implemented as hardware logic in some embodiments and, in other embodiments, some of the blocks may be implemented by at least one processor executing a software module. Hereinafter, FIG. 2 will be described with reference to FIG. 1.

The protocol stack system 20 may include a first protocol stack 21 and a second protocol stack 22 respectively relevant to the first SIM 141 and the second SIM 142. As described above with reference to FIG. 1, the first protocol stack 21 and the second protocol stack 22 may each support an appropriate radio access technology (RAT). In some embodiments, the first protocol stack 21 and the second protocol stack 22 may interact with a shared upper layer, for example, an application layer, and the upper layer may obtain information relevant to the first wireless communication 11 and the second wireless communication 12 or provide an interface for programs providing commands. The upper layer may be implemented in the multi-SIM device 130 or in another device separated from the multi-SIM device 130. In addition, the protocol stack system 20 may include a hardware interface 24 shared by the first protocol stack 21 and the second protocol stack 22. The hardware interface 24 may provide an interface for hardware, that is, the transceiver 120 of FIG. 1, and the first protocol stack 21 and the second protocol stack 22 may provide signals to the transceiver 120 and/or obtain signals from the transceiver 120 via the hardware interface 24. It is noted that the hardware interface 24 may be referred to as a driver of the transceiver 120.

Each of the first protocol stack 21 and the second protocol stack 22 may, for forming the control plane, comprise a plurality of layers. As shown in FIG. 2, the first protocol stack 21 may include the first layer L1, the second layer L2, and the third layer L3. The first layer L1, the second layer L2, and the third layer L3 may correspond to three lower layers of an Open System Interconnection (OSI) model. For example, in LTE or 5G NR, a physical (PHY) layer may be include in the first layer L1, a Medium Access Control (MAC) layer, a Radio Link Control (RLC) layer, and a Packet Data Convergence Protocol (PDCP) layer may be included in the second layer L2, and a Radio Resource Control (RRC) layer and a Non-Access Stratum (NAS) layer may be included in the third layer L3. Similarly to the first protocol stack 21, the second protocol stack 22 may also include a first layer L, a second layer L2, and a third layer L3.

In the discussion to follow, operations described as being performed by the UE 100 involving the RRC layer and the RRC idle state may be performed by the MSMD 130 (which may include a processor executing instructions read from memory to carry out the same). The RRC layer of the UE 100 may be understood as being the RRC layer of the MSMD 130. The RRC layer in the third layer L3 may control the radio resources and exchange RRC messages with the RRC layer in the base station 211/221. When RRC connection is established between an RRC layer of the UE 100 and an RRC layer of the base station 211/221, the UE 100 may be switched to an RRC connected state (or an "RRC connected mode"). On the other hand, when the RRC connection is released, the UE 100 may be switched to an RRC idle state (or an "RRC idle mode"). Herein, the RRC connected state may be referred to as a connected state of a wireless communication, and the RRC idle state may be referred to as an idle state of the wireless communication. For example, when the RRC connected state is maintained by the RRC layer included in the first protocol stack 21, the first wireless communication 11 may be referred to as being in the connected state; on the other hand, when the RRC idle state is maintained by the RRC layer included in the first protocol stack 21, the first wireless communication 11 may be referred to as being in the idle state. Similarly, the second wireless communication 12 may also be referred to as being in the connected state or idle state by the RRC layer included in the second protocol stack 22.

In the RRC idle state, the base station 211/221 (that is, the first base station 211 and/or the second base station 221) may periodically transmit the paging. The base station may, for the UE 100, provide information regarding a time point at which the paging is transmitted, that is, the paging occasion, to the UE 100. The UE 100 may check whether paging including an identifier of the UE 100 is received, by monitoring the paging. The UE 100 may, to reduce consumed power in the RRC idle state, receive and process a packet only in a period corresponding to the paging occasion. As described above with reference to FIG. 1, the paging received in the RRC idle state may have a high priority. Hereinafter, referring to FIGS. 3A through 3C, examples in which collisions occur between paging associated with one SIM and a wireless communication associated with another SIM in the multi-SIM wireless communication will be described.

A conflict handler 23 may predict a collision between the first wireless communication 11 by the first protocol stack 21 and the second wireless communication 12 by the second protocol stack 22 and, when the collision is predicted, determine whether the first wireless communication 11 and the second wireless communication 12 may be simultaneously received. For example, the conflict handler 23 may predict the collision between the first wireless communication 11 and the second wireless communication 12, based on information provided from the first layer L1 of the first protocol stack 21 and the second layer L2 of the second protocol stack 22. When the collision is predicted, the conflict handler 23 may, based on information provided from the hardware interface 24, determine whether the first wireless communication 11 and the second wireless communication 12 may be simultaneously received. In addition, when it is determined that the simultaneously reception is possible, the conflict handler 23 may set hardware, that is, the transceiver 120, through the hardware interface 24, for the simultaneous reception of the first wireless communication 11 and the second wireless communication 12. As will be described for some embodiments with reference to FIG. 14, instructions of the conflict handler 23 may be stored in a memory as a software module, and executed by at least one processor. The conflict handler 23 may also be a hardware module designed by logic synthesis in some embodiments.

Figure 3A:
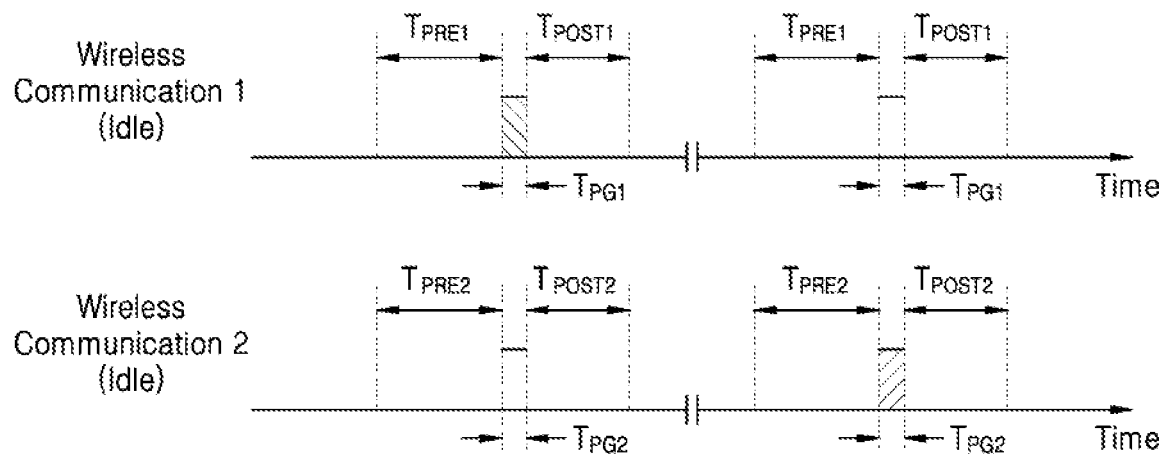
FIGS. 3A, 3B and 3C are timing diagrams each illustrating an example of a collision that may occur in multi Subscriber Identify Module (SIM) wireless communications, according to comparative examples.
Figure 3B:
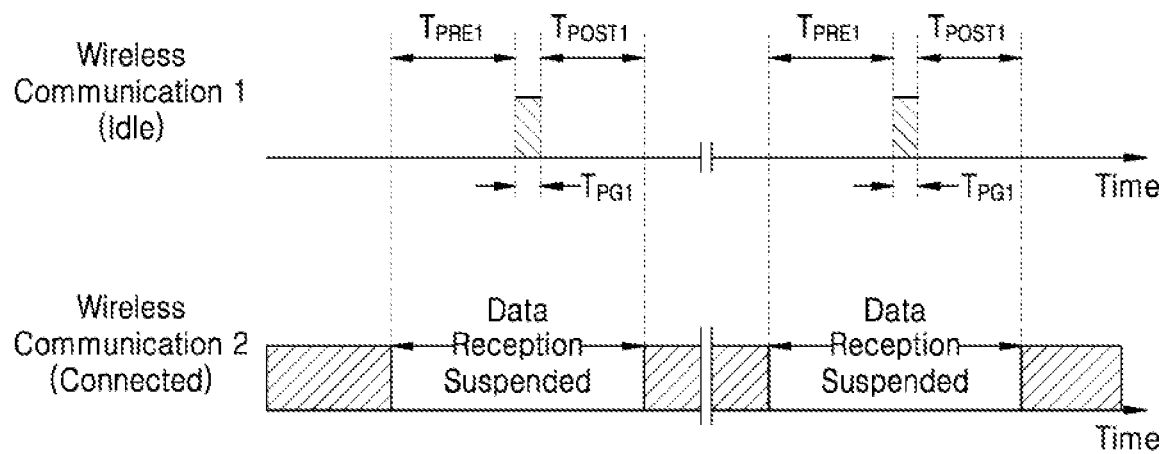
Figure 3C:
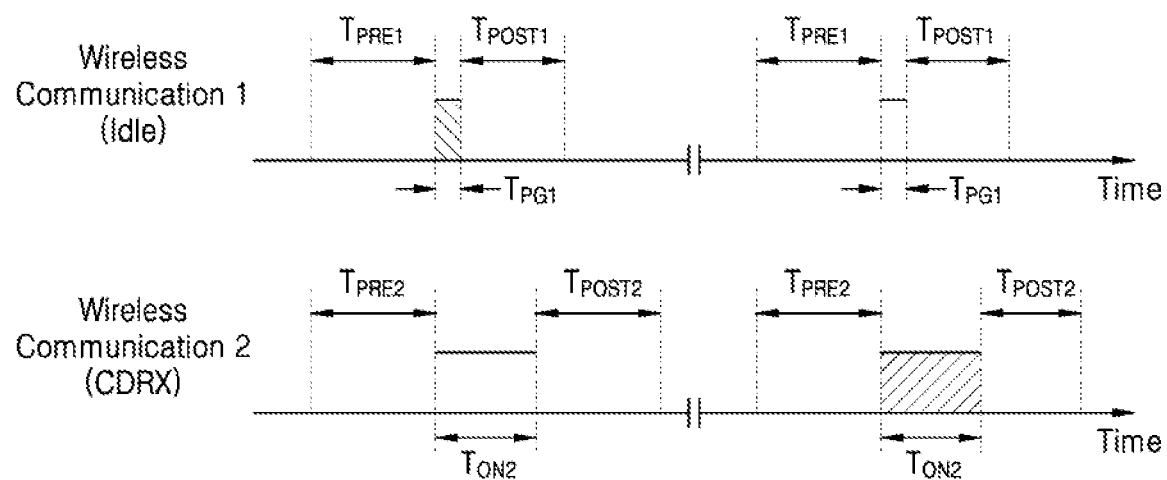

FIGS. 3A through 3C are timing diagrams illustrating respective examples of collisions that may occur in multi-SIM wireless communication handled by conventional multi-SIM UEs. FIGS. 3A-3C also illustrate time periods before, during, and after designated slots for paging or other communications (e.g., an On-period of CDRX), that may be computed/obtained in embodiments of the present inventive concept. These time periods may be used to set windows for predicting collisions, for the purpose of avoiding the suspension of communication, as occurs in the related art. For instance, FIG. 3A illustrates an example of a collision between the first wireless communication and the second wireless communication that are in the idle state. FIG. 3B illustrates an example of a collision between the first wireless communication in the idle state and the second wireless communication in the connected state. FIG. 3C illustrates an example of a collision between the first wireless communication in the idle state and the second wireless communication in a Connected Discontinuous RX (CDRX) state. In FIGS. 3A through 3C, it is assumed that the first wireless communication and the second wireless communication respectively are the first wireless communication 11 and the second wireless communication 12 shown in FIG. 1, and FIGS. 3A through 3C will be described with reference to FIG. 1. Among descriptions of FIGS. 3A through 3C, descriptions overlapping those of FIG. 1 will omitted.

In the multi-SIM wireless communication, collisions between the wireless communications respectively corresponding to different SIMs may refer to occasions in which at least two wireless communications attempt to occupy an RF resource at a same time point when the RF resource is occupied with mutual exclusiveness by the wireless communications. For example, in MSMS or Dual SIM Dual Standby (DSDS), a wireless communication associated with one SIM may occupy the RF resource, and the RF resource may be first allocated to a corresponding protocol stack according to priorities of processes to be performed by the protocol stacks corresponding to the SIMs. Accordingly, when an operation having a high priority, e.g., the first paging of the first wireless communication 11, collides with another wireless communication, e.g., the second wireless communication 12, receive operations of the second wireless communication 12 may be suspended while the first paging is received and processed.

Referring to FIG. 3A, when both the first wireless communication 11 and the second wireless communication 12 are in the idle state, the first paging of the first wireless communication 11 and the second paging of the second wireless communication 12 may conflict each other. As shown in the upper portion of FIG. 3A, before receiving the first paging, hardware like the transceiver 120 and/or the multi-SIM device 130 may be set for a period ($T_{PRE1}$) to receive the first paging. For example, the transceiver 120 may form at least one RF path to receive the first paging for the period $T_{PRE1}$ and/or the multi-SIM device 130 may perform an operation of setting, for example, a parameter for processing the reception signal RX received from the transceiver 120. Next, the first paging may be received during the period $T_{PG1}$, and processing of the received first paging, for example, modulating, decoding, processing a paging message in the RRC layer, and the like, may be performed during the period $T_{POST1}$. Accordingly, a period consumed for receiving the first paging from the UE 100 and process the first paging may correspond to $T_{PRE1}+T_{PG1}+T_{POST1}$. Similarly, a period in which the second page of the second wireless communication 12 are received and processed may correspond to $T_{PRE2}+T_{PG2}+T_{POST2}$.

Herein, a period for receiving and processing the paging may be referred to as a paging window, a period for receiving and processing the first paging may be referred to as a first paging window, and a period for receiving and processing the second paging may be referred to as a second paging window. Furthermore, a period allocated before receiving the paging from the paging window, like the period $T_{PRE1}$, may be referred to as a pre-processing period, a period for receiving the paging, like the period $T_{PG1}$, may be referred to as a paging reception period or reception period, and a period required after receiving the paging, like the period $T_{POST1}$, may be referred to as a post-processing period. Accordingly, the paging window may include the pre-processing period, the receiving period, and the post-processing period.

A collision between the first paging and the second paging may occur when the first paging window and the second paging window overlap each other in time. When the first paging window and the second paging window overlap each other, only one of the first paging and the second paging may be efficiently received and processed. Accordingly, as shown in FIG. 3A, the first paging may first be received and processed, and next, the second paging may be received and processed. As a result, some data of the first paging or the second paging may be lost.

Referring to FIG. 3B, when the first wireless communication 11 is in the idle state and the second wireless communication 12 is in the connected state, the first paging of the first wireless communication 11 and the data reception of the second wireless communication 12 may conflict each other. In other words, when the first paging occurs while receiving the data through the second wireless communication 12, a collision may occur between the first wireless communication 11 and the second wireless communication 12. Due to high priority of the first paging, as shown in FIG. 3B, receiving data through the second wireless communication 12 in the period for receiving and processing the first paging, that is, the first paging window, may be deferred or even lost. The data reception through the second wireless communication 12 may resume after the first paging window is closed. As a result, data throughput of the second wireless communication 12 may decrease. Further if the base station (e.g., the second base station 221) determines that the channel condition is sub-par, due to, e.g., the base station 221 not receiving expected response messages, the base station may make adjustments to its data transmission to slow down the data rate, etc., and data throughput may additionally decrease.

Referring to FIG. 3C, when the first wireless communication 11 is in the idle state and the second wireless communication 12 is in the CDRX state, the first paging of the first wireless communication 11 and on-duration of the second wireless communication 12 may conflict with each other. The UE 100 may, in CDRX state, reduce power consumption according to CDRX information provided from the base station (for example, the first base station 211 and/or the second base station 221) while maintaining the connected state. For example, for CDRX, the base station may provide timing and duration of the on-duration corresponding to the period in which the UE 100 receives data, as CDRX information. As shown at the lower portion of FIG. 3C, to receive data before the on-duration, hardware, for example, the transceiver 120 and/or the multi-SIM device 130, may be set during the period $T_{PRE2}$. Next, the on-duration may be maintained during the period $T_{ON2}$, and the data received during the on-duration may be processed during the period $T_{POST2}$. Accordingly, a period allocated for the UE 100 to receive and process the data during the on-duration of the second wireless communication 12 may correspond to $T_{PRE2}+T_{ON2}+T_{POST2}$. The period $T_{PRE2}$ and the period $T_{POST2}$ shown in FIG. 3C may, in some embodiments, be respectively identical to the period $T_{PRE2}$ and the period $T_{POST2}$ shown in FIG. 3A, and may, in other embodiments, differ from the respective periods $T_{PRE2}$, $T_{POST2}$ shown in FIG. 3A.

Herein, a total period for receiving and processing data in the on-duration in the CDRX state may be referred to as a CDRX window. In addition, windows associated with the first wireless communication 11, that is, the first paging window and the first CDRX window may be collectively referred to as a first window; and windows associated with the second wireless communication 12, that is, the second paging window and the second CDRX window, may be collectively referred to as a second window.

A collision may occur between the first paging and the second on-duration when the first paging window and the second CDRX window overlap each other in time. When the first paging window and the second CDRX window overlap each other, only one of the first paging and the on-duration of the second wireless communication 12 may be efficiently processed. Accordingly, as shown in FIG. 3C, the first paging may be first received and processed, and next, the data may be received and processed during the on-duration of the second wireless communication 12. As a result, some data of the first paging or the on-duration signals of the second wireless communication 12 may be lost.

FIG. 4 is a flowchart illustrating a method of the multi-SIM wireless communication according to an example embodiment of the inventive concept. For example, the method shown in FIG. 4 may be performed by using the multi-SIM device 130 shown in FIG. 1 (or the conflict handler 23 shown in FIG. 2), and hereinafter, FIG. 4 will be described with reference to FIG. 1.

In operation S100, an operation of setting a window may be performed. As described above with reference to FIGS. 3A through 3C, the window may refer to the paging window for receiving and processing paging or the CDRX window for receiving and processing data in on-duration in the idle state. A window may include, in addition to a period for receiving paging or data, a pre-processing period and a post-processing period. For example, the multi-SIM device 130 may set the first paging window and the first CDRX window as the first window of the first wireless communication 11 relevant to the first SIM 141 and set the second paging window and the second CDRX window as the second window of the second wireless communication 12 relevant to the second SIM 142.

It is noted here that in some embodiments, the multi-SIM device 130 may have parallel processing capability, such that it may be able to post-process data from two or more communications simultaneously. In this case, when considering overlap of windows, the post-processing times may be effectively reduced to very short time durations, or even omitted from consideration. In other words, with effective parallel processing by multi-SIM device 130, the time duration of windows that are set may be based on a sum of a pre-processing period (e.g. $T_{PRE1}$) and a reception period (e.g. $T_{PG1}$).

An operation of predicting a collision or non-collision (i.e., determining that a collision or non-collision will occur due to the respective timings of the paging signals/data frames of the two communications if simultaneous reception is not implemented) between the first wireless communication 11 and the second wireless communication 12 may be performed in operation S300. For example, the multi-SIM device 130 may predict the collision or non-collision, based on the window established in operation S100 for the first wireless communication 11, and timing information of data to be received for the second wireless communication 12. The multi-SIM device 130 may predict the collision when the first window of the first wireless communication 11 and the second window of the second wireless communication 12 overlap each other, and otherwise, may predict a non-collision. In addition, when the first window overlaps the data reception period of the second wireless communication 12 or the second window overlaps the data reception period of the first wireless communication 1, the multi-SIM device 130 may predict a collision. As shown in FIG. 4, when it is predicted that a collision will occur, operation S500 may be performed thereafter; on the other hand, when it is predicted that a collision will not occur, the method shown in FIG. 4 may end. An example of operation S300 will be described hereinafter with reference to FIG. 8.

An operation of determining whether a simultaneous reception of the first wireless communication 11 and the second wireless communication 12 is possible may be performed in operation S500. Unlike when the non-collision is determined in operation S300, when the collision is predicted in operation S300, it may be determined whether a simultaneous reception of the first wireless communication 11 and the second wireless communication 12 is possible. For example, the multi-SIM device 130 may determine whether the simultaneous reception is possible, based on a hardware configuration, for example, a radio frequency (RF) resource provided by the transceiver 120. In some embodiments, a determination as to whether the simultaneous reception is possible may be based on whether the transceiver 120 provides CA and/or MC, configurations of CA and/or MC currently provided by the transceiver 120, and the like. As shown in FIG. 4, operation S700 may be performed thereafter when it is determined that the simultaneous reception is possible, and when it is determined that the simultaneous reception is impossible, operation S900 may be subsequently performed. An example of operation S500 will be described later with reference to FIG. 10.

An operation of allocating the RF paths may be performed in operation S700. When it is determined that the simultaneous reception is possible in operation S500, an operation of allocating the RF paths to the wireless communications for simultaneous reception may be performed. For example, when the transceiver 120 provides CA, the multi-SIM device 130 may allocate at least one CC respectively to the first wireless communication 11 and the second wireless communication 12. Accordingly, each of the first wireless communication 11 and the second wireless communication 12 may be processed by the transceiver 120 via the RF paths formed by the at least one CC, and processed signals may be efficiently provided to the multi-SIM device 130. In addition, when the transceiver 120 provides MC, the multi-SIM device 130 may allocate two different connections respectively to the first wireless communication 11 and the second wireless communication 12.

An operation of suspending some wireless communications may be performed in operation S900. When the simultaneous reception is determined as impossible in operation S500, an operation of suspending a wireless communication having a relatively lower priority (for example, the second wireless communication described with reference to FIG. 3B) may be performed. The suspended wireless communication may resume after operations of receiving and processing are completed in a wireless communication having a relatively higher priority.

Figure 5A:
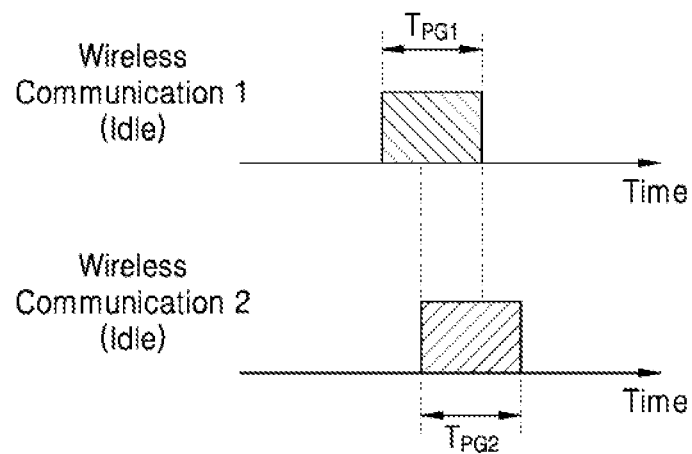
FIGS. 5A and 5B are timing diagrams illustrating examples of simultaneous reception according to example embodiments of the inventive concept.
Figure 5B:
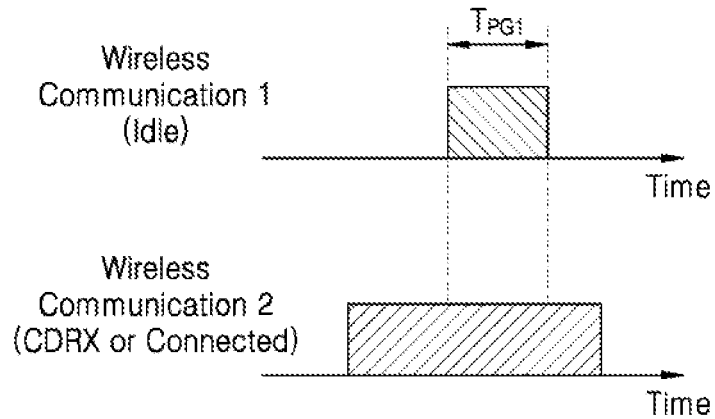

FIGS. 5A and 5B are timing diagrams illustrating examples of simultaneous reception according to example embodiments of the inventive concept. More particularly, FIG. 5A illustrates simultaneous reception of the first wireless communication 11 and the second wireless communication 12 in the idle state, and FIG. 5B illustrates simultaneous reception of the first wireless communication 11 in the idle state and the second wireless communication 12 in the CDRX state or the connected state. In contrast to the situations described above with reference to FIGS. 3A through 3C, the first wireless communication 11 and the second wireless communication 12 may be simultaneously received according to the method described in FIG. 4, and accordingly, communication efficiency in multi-SIM communication may be improved. In FIGS. 5A and 5B, it is assumed that the first communication and the second communication are the first wireless communication 11 and the second wireless communication 12 shown in FIG. 1, and FIGS. 5A and 5B will be described with reference to FIG. 1. Among descriptions of FIGS. 5A and 5B, descriptions overlapping those of FIG. 1 will be omitted.

Referring to FIG. 5A, when both the first wireless communication 11 and the second wireless communication 12 are in the idle state, the first paging of the first wireless communication 11 and the second paging of the second wireless communication 12 may be simultaneously received. For example, when the period $T_{PG1}$ receiving the first paging and the period $T_{PG2}$ receiving the second paging overlap each other, as shown in FIG. 5A, the first paging and the second paging may be efficiently received and processed. In addition, unlike shown in FIG. 5A, when the pre-processing period and/or the post-processing period of the first paging overlaps the pre-processing period and/or the post-processing period of the second paging, the first paging and the second paging may be efficiently received and processed.

Referring to FIG. 5B, when the first wireless communication 11 is in the idle state and the second wireless communication 12 is in the CDRX state or the connected state, the first paging and the data transmitted through the second wireless communication 12 may be simultaneously received. For example, as shown in FIG. 5B, when the period $T_{PG1}$ receiving the first paging overlaps the period receiving the data transmitted through the second wireless communication 12, the first paging and the data transmitted through the second wireless communication 12 may be simultaneously received. In addition, unlike that shown in FIG. 5B, the first paging and the data transmitted through the second wireless communication 12 may be simultaneously received when the pre-processing period and/or the post-processing period of the first paging overlaps the pre-processing period, the reception period, and/or post-processing period for receiving and processing the data transmitted through the second wireless communication 12.

Figure 6:
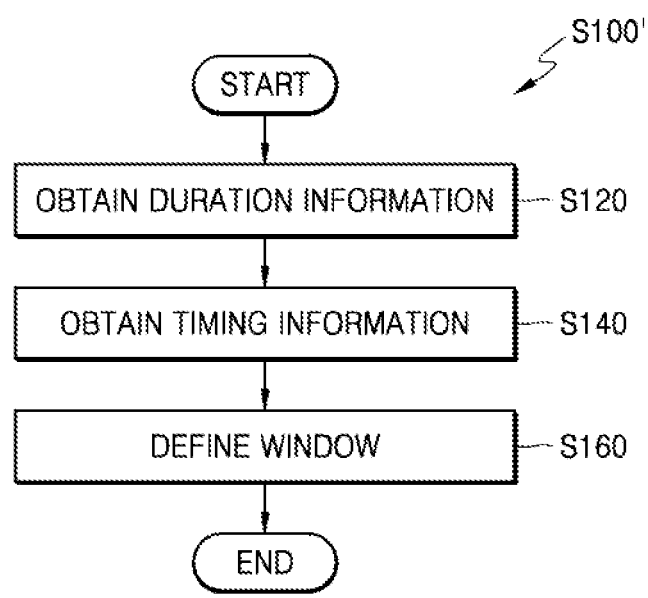
FIG. 6 is a flowchart illustrating an example of operation of setting a window shown in FIG. 4, according to an example embodiment of the inventive concept.
Figure 7A:
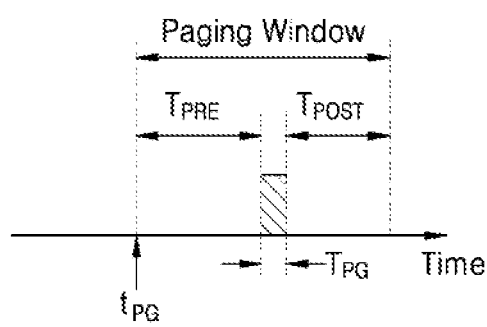
FIGS. 7A and 7B are diagrams illustrating examples of windows, according to example embodiments of the inventive concept.
Figure 7B:
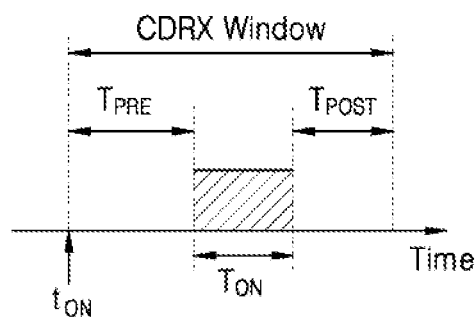

FIG. 6 is a flowchart illustrating an example of operation S100 shown in FIG. 4, and FIGS. 7A and 7B are diagrams respectively illustrating examples of windows according to the inventive concept. As described above with reference to FIG. 4, an operation of establishing a window may be performed in operation S100' shown in FIG. 6. Hereinafter, FIGS. 6, 7A, and 7B will be described with reference to FIGS. 1 and 4.

Referring to FIG. 6, operation S100' may include operations S120, S140, and S160. An operation of obtaining duration information may be performed in operation S120. The duration information may include information regarding the pre-processing period, the reception period, and the post-process period. For example, the multi-SIM device 130 may obtain information regarding the pre-processing period that depends on characteristics of the transceiver 120. In some embodiments, the multi-SIM device 130 may receive the information regarding the pre-processing period from the transceiver 120; and in some embodiments, the multi-SIM device 130 may read the information regarding the pre-processing period from the memory storing the information.

In some embodiment, the multi-SIM device 130 may access a memory (e.g., memory 134 of FIG. 14) storing information regarding pre-processing periods respectively corresponding to a plurality of transceivers, and in some embodiments, the multi-SIM device 130 may, according to an identifier of the transceiver 120 provided from the transceiver 120, read information regarding one of the pre-processing periods from the memory. In some embodiments, the multi-SIM device 130 may use the pre-processing period, as a fixed value including some margins, independently to the transceiver 120.

The multi-SIM device 130 may obtain information regarding a reception period of paging defined by RAT. For example, in LTE, 5G NR, and the like, the paging may be transmitted in a sub-frame, and accordingly, the reception period of the paging may approximately correspond to 1 ms.

The multi-SIM device 130 may obtain information regarding the post-process period that depends on the characteristics of the transceiver 120 and/or capacity of the protocol stack 20. The paging or signal received during the reception period may be processed by the transceiver 120, and the multi-SIM device 130 may process the reception signal RX provided from the transceiver 120. For example, when a paging is received, a paging message may be finally processed in the RRC layer included in the third layer L3 and, accordingly, a time period consumed for processing the paging message from the lower layer to the RRC layer may be included in the post-processing period. In some embodiments, the multi-SIM device 130 may obtain information about the post-processing period that depends upon reception targets. In some embodiments, the multi-SIM device 130 may also read information regarding one post-processing period from the memory which stores a plurality of post-processing periods. Furthermore, in some embodiments, the multi-SIM device 130 may also use the reception period as a fixed value including some margin.

An operation of obtaining timing information may be performed in operation S140. The timing information may include information regarding a time point at which a window is generated. For example, the base station (for example, the first base station 211 and the second base station 221) may, as information regarding the paging occasion, provide a paging frame (PF) and a paging offset (PO) to the UE 100. For example, in LTE, 5G NR, and the like, a frame may have a length of about 10 ms and include 10 sub frames each having a length of about 1 ms, and the paging opportunity may be limited to one sub-frame, that is, a 1 ms period. The PF may indicate a frame corresponding to the paging occasion, and the PO may indicate through which sub-frame from among the ten sub-frames included in the frame the paging is transmitted. The multi-SIM device 130 may obtain the PF and the PO as the timing information of the window, and thus, may determine the time point at which the window is generated.

An operation of defining the window may be performed in operation S160. The window may be defined based on the duration information obtained in operation S120 and the timing information obtained in operation S140. For example, as shown in FIG. 7A, the paging window receiving the paging may be defined as having a length including the pre-processing period $T_{PRE}$, the reception period of the paging $T_{PG}$, and the post-processing period $T_{POST}$, based on the duration information, and may be defined as starting at the time point $t_{PG}$ based on the timing information. In addition, as shown in FIG. 7B, the CDRX window, which receives and processes the data in the on-duration in the CDRX state, may be defined as having a length including the pre-processing period $T_{PRE}$, the reception period $T_{ON}$ corresponding to the on-duration, and the post-processing period $T_{POST}$, and may be defined as starting at a time point $t_{ON}$ based on the timing information. In some embodiments, lengths of the pre-processing period $T_{PRE}$ in FIG. 7A and the pre-processing period $T_{PRE}$ in FIG. 7B may be identical to each other, and length of the post-processing period $T_{POST}$ and the post-processing period $T_{POST}$ may be identical to each other.

Figure 8:
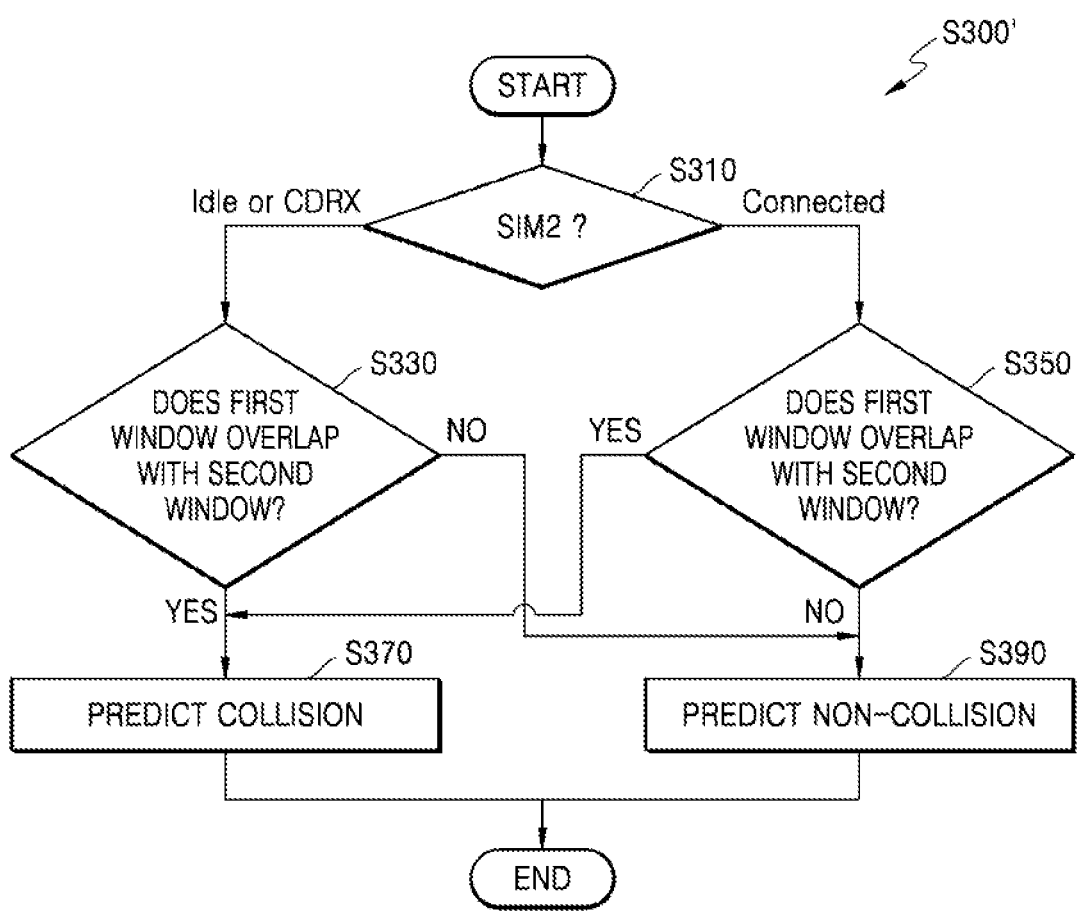
FIG. 8 is a flowchart illustrating an example of operation of determining a collision or non-collision shown in FIG. 4, according to an example embodiment of the inventive concept.
Figure 9A:
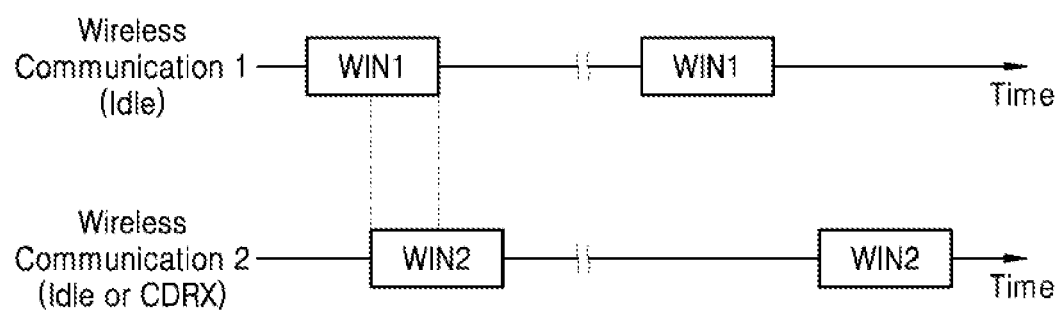
FIGS. 9A and 9B respectively illustrate examples of predicted collisions, according to example embodiments of the inventive concept.
Figure 9B:
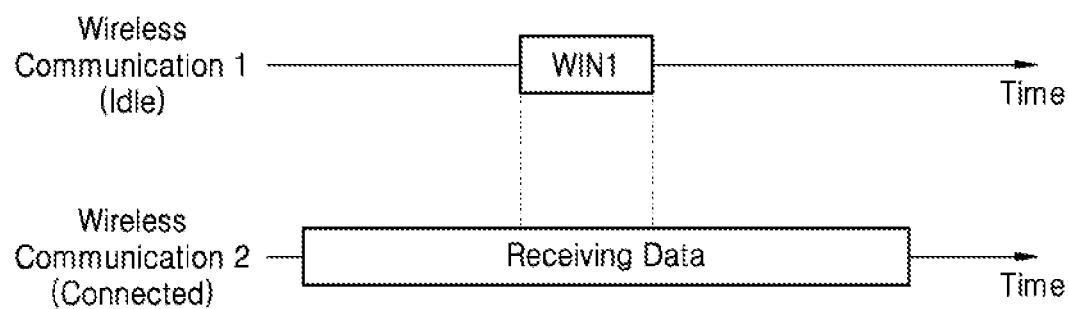

FIG. 8 is a flowchart showing an example of operation S300 shown in FIG. 4 according to an example embodiment of the inventive concept; FIGS. 9A and 9B are diagrams illustrating examples of predicted collisions, according to example embodiments of the inventive concept. As described above with reference to FIG. 4, an operation of determining the collision or non-collision between the wireless communications in the multi-SIM wireless communication may be performed in operation S300' shown in FIG. 8. More particularly, operation S300' in FIG. 8 indicates the operation of determining the collision or non-collision between the first wireless communication 11 and the second wireless communication 12 respectively corresponding to the first SIM 141 and the second SIM 142 shown in FIG. 1, and in FIG. 8, it is assumed that the first wireless communication 11 is in the idle state. Hereinafter, FIGS. 8, 9A, and 9B will be described with reference to FIGS. 1 and 4.

Referring to FIG. 8, operation S300' may include a plurality of operations S310, S330, S350, S370, and S390. An operation of determining a state of the second wireless communication 12 corresponding to the second SIM 142 may be performed in operation S310. As shown in FIG. 8, when the second wireless communication 12 is in the idle state or the CDRX state, operation S330 may be performed thereafter; on the other hand, when the second wireless communication 12 is in the connected state, operation S350 may be subsequently performed.

An operation of determining whether the first window and the second window overlap each other may be performed in operation S330. As the first wireless communication 11 is in the idle state, the first window may correspond to the first paging window; meanwhile, the second window may be the second paging window when the second wireless communication 12 is in the idle state, and may be the second CDRX window when the second wireless communication 12 is in the CDRX state. For example, referring to FIG. 9A, the first window WIN1 and the second window WIN2 may or may not overlap on the time scale. When the first window and the second window overlap each other, the collision may be determined in operation S370; when the first window and the second window do not overlap each other, non-collision may be determined in operation S390. As described above, the multi-SIM device 130 may determine collision or non-collision between the first wireless communication 11 and the second wireless communication 12 by determining whether the first window WIN1 and the second window WIN2 established in operation S100 shown in FIG. 4 overlap each other on the time scale.

An operation of determining whether the first window and the reception period of the second SIM 142 overlap each other may be performed in operation S350. The reception period of the second SIM 142 may refer to a period in which the second wireless communication 12 associated with the second SIM 142 receives data in the connected state. For example, referring to FIG. 9B, the reception period which receives data in the second wireless communication 12 in the connected state and the first window may overlap each other on the time scale. As shown in FIG. 8, when the first window and the reception period of the second SIM 142 overlap each other, collision may be determined in operation S370; when the first window and the reception period of the second SIM 142 do not overlap each other, non-collision may be determined in operation S390.

Figure 10:
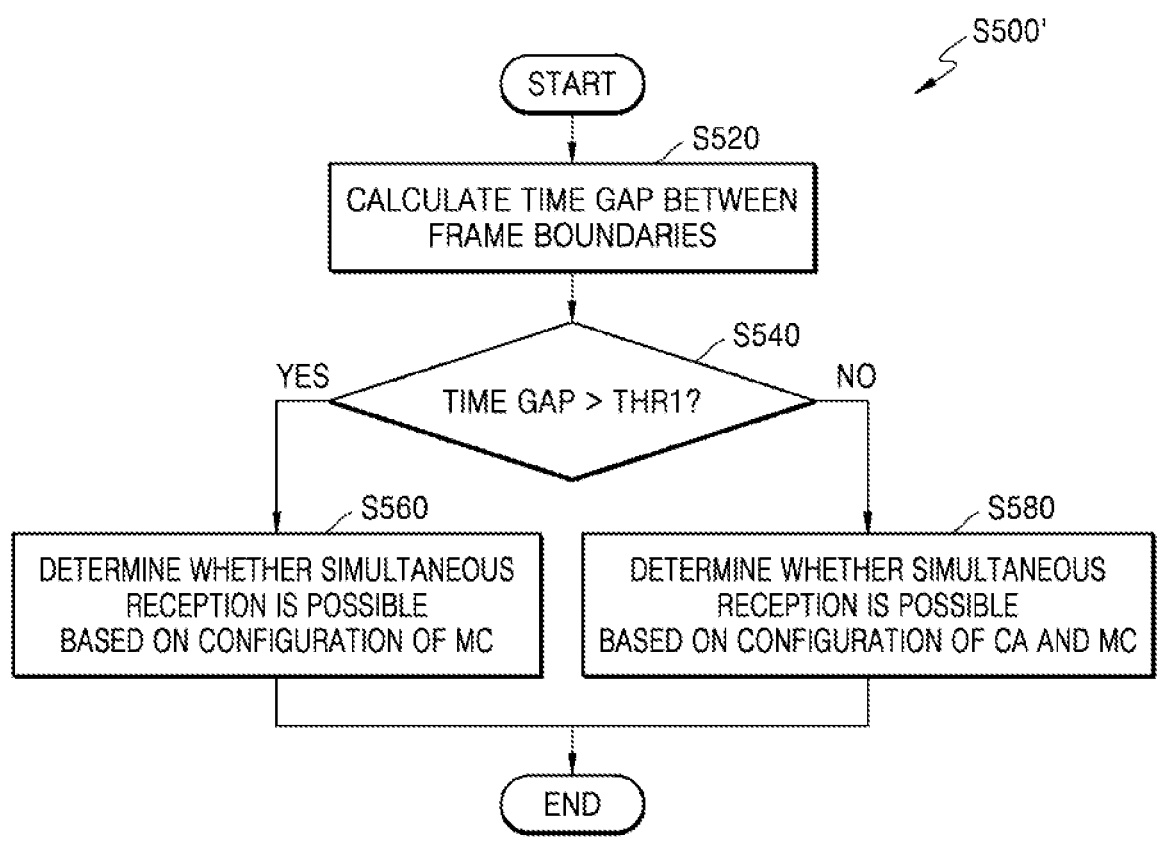
FIG. 10 is a flowchart illustrating an example of operation of determining whether a simultaneous reception is possible shown in FIG. 4.

FIG. 10 is a flowchart illustrating an example of operation S500 shown in FIG. 4, according to an example embodiment of the inventive concept. As described above with reference to FIG. 4, when collision is predicted in operation S300 in FIG. 4, an operation of determining whether the simultaneous reception is possible may be performed in operation S500' shown in FIG. 10. As shown in FIG. 10, operation S500' may include operations S520, S540, S560, and S580, and hereinafter, FIG. 10 will be described with reference to FIGS. 1 and 4.

An operation of calculating a time gap between frame boundaries may be performed in operation S520. The frame boundaries may correspond to timings of frames transmitted during the wireless communications respectively associated with the plurality of SIMs, and the time gap between the frame boundaries may be used as a basis for determining whether the simultaneous reception is possible. For example, when the time gap between the frame boundaries of the first wireless communication 11 and the second wireless communication 12 is relatively high, the simultaneous reception of the first wireless communication 11 and the second wireless communication 12 by using CA may not be easily performed. In other words, frames received approximately at a same timing point may be simultaneously processed; and frames that are not received at a same timing point may be limited from being simultaneously processed. Accordingly, in operation S520, the time gap between the frame boundaries corresponding to different wireless communications may be calculated, and the time gap may be used for determining whether the simultaneous reception is possible.

An operation of comparing the time gap to the threshold value THR1 may be performed in operation S540. As shown in FIG. 10, when the time gap calculated in operation S520 is greater than the first threshold value THR1, operation S560 may be performed thereafter; and when the time gap is less than the first threshold value THR1, operation S580 may be subsequently performed. In some embodiments, unlike in FIG. 10, when the time gap is less than the first threshold value THR1, operation S560 may also be performed thereafter; and when the time gap is greater than the first threshold value THR1, operation S580 may also be performed thereafter.

In some embodiments, the first threshold value THR1 may be defined based on a cyclic prefix (CP). For example, a frame may include a plurality of sub frames, a sub frame may include a plurality of slots, and a slot may include a plurality of symbols, for example, a plurality of Orthogonal Frequency Division Multiplexing (OFDM) symbols. The OFDM symbols included in the slot may vary according to a configuration of CP, and CP may include an "extended CP" and a "normal CP". For example, in a normal CP, a slot may include seven OFDM symbols; in an extended CP, a slot may include six OFDM symbols. When a channel state for wireless communication is unstable, like when the UE 100 is in transportation, the extended CP may be used to reduce Inter-Symbol Interference (ISI). In some embodiments, the normal CP may have a length of about 5.1 µs, the extended CP may have a length of about 16.7 µs. Herein, the length of CP may simply be referred to as CP. When the time gap between the frame boundaries is greater than CP, the simultaneous reception by using CA may not be easily performed, and thus, the first threshold value THR1 may be determined based on CP.

An operation of determining whether the simultaneous reception is possible based on a configuration of MC may be performed in operation S560. In operation S540, when the time gap is determined as being greater than the first threshold value THR1, the simultaneous reception by using CA may not be easily performed. Accordingly, the multi-SIM device 130 may, as the RF resource, determine whether the simultaneous reception is possible, according to whether the transceiver 120 provides MC and whether an RF path formed due to MC may be added in the current state of the transceiver 120. In other words, when the transceiver 120 provides MC, the multi-SIM device 130 may determine whether the simultaneous reception is possible based on the current state of the transceiver 120, regardless of the time gap calculated in operation S520.

An operation of determining whether the simultaneous reception is possible based on the configurations of CA and MC may be performed in operation S580. When the time gap is determined as being less than or equal to the first threshold value THR1, the simultaneous reception by using CA may be performed. Accordingly, the multi-SIM device 130 may, as the RF resource, determine whether the simultaneous reception is possible based on configurations of MC and CA. For example, the multi-SIM device 130 may determine whether the simultaneous reception is possible, based on whether the transceiver 120 provides CA and existence or non-existence of a CC that may be used in the current state of the transceiver. In some embodiments, when the transceiver 120 does not provide MC, but provides CA, the multi-SIM device 130 may determine whether the simultaneous reception is available based on configuration of CA. In some embodiments, when the transceiver 120 provides both CA and MC, the multi-SIM 130 may determine whether the simultaneous reception is available based on configurations of CA and MC.

Figure 11:
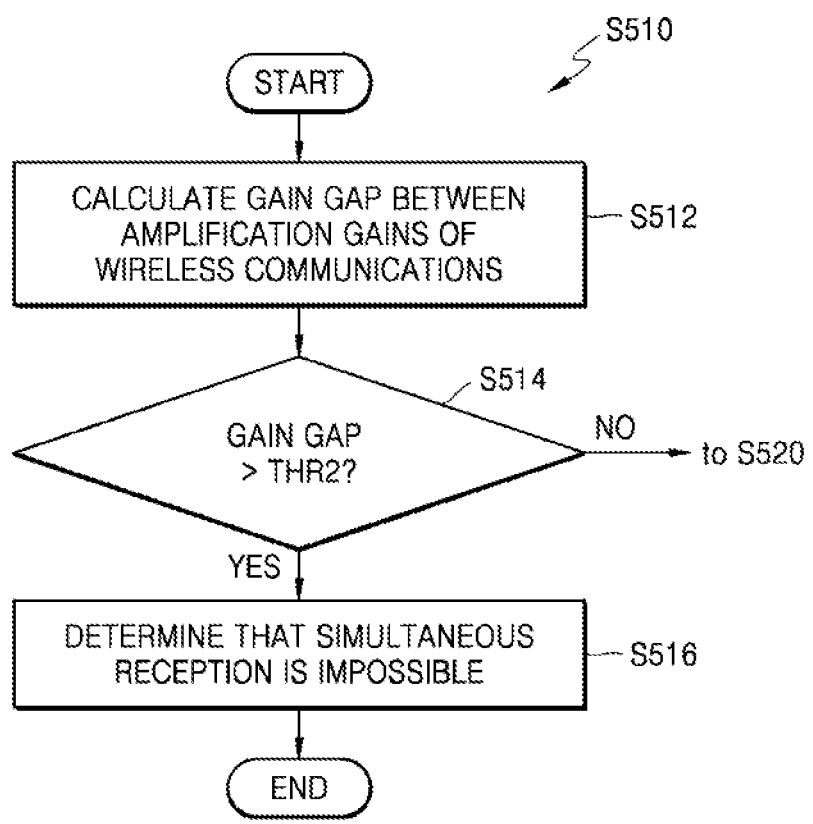
FIG. 11 is a flowchart describing a method of determining whether wireless communications are simultaneously received, according to an example embodiment of the inventive concept.

FIG. 11 is a flowchart describing a method of determining whether the simultaneous reception is possible, according to an example embodiment of the inventive concept. In some embodiments, operation S510 of FIG. 11 may be included in operation S500 shown in FIG. 4 and be performed before operation S520 of FIG. 10. As shown in FIG. 11, operation S510 may include a plurality of operations S512, S514, and S516, and hereinafter, FIG. 11 will be described with reference to FIGS. 1, 4, and 5.

In some embodiments, whether the simultaneous reception of the wireless communications respectively associated with the plurality of SIMs is possible may be determined based on channel states of the wireless communications. For example, a gap between (i.e., difference in) amplification gains used for receiving signals in the wireless communications may be used for determining whether the simultaneous reception by using CA is possible. When there is a wide gap between a first amplification gain used for receiving a signal from the wireless communication and a second amplification gain used for receiving a signal from the second wireless communication 12, the simultaneous reception of the first wireless communication 11 and the second wireless communication 12 by using CA may not be easily performed. In other words, when the first amplification gain is considerably greater than the second amplification gain and the signal received from the second wireless communication 12 is amplification based on the first amplification gain, noise received from the second wireless communication 12 may be amplified, or a range of an efficient signal may exceed a dynamic range of an amplifier. Accordingly, the gain gap between the amplification gains of the wireless communications may be used for determining whether the wireless communications may be simultaneously received. It is noted that in some cases, the gain gap may be one of several factors in the simultaneous reception determination. For instance, to determine whether the simultaneous reception is possible based on channel states, the amplification gains and factors similar to the amplification gains (for example, a modulation order and the like) may be used, and when a gap between a satisfactory channel and an unsatisfactory channel is wide, the impossibility of the simultaneous reception may be determined in advance.

An operation of calculating a gain gap between the amplification gains of the wireless communications may be performed in operation S512. For example, the multi-SIM device 130 may establish an amplification gain for amplifying an RF signal received from the transceiver 120 via the antenna array 110. Accordingly, the multi-SIM device 130 may obtain the first amplification gain corresponding to the first wireless communication 11 and the second amplification gain corresponding to the second wireless communication 12, and may calculate a gain gap between the first amplification gain and the second amplification gain.

An operation of comparing the gain gap between the amplification gains to a second threshold value THR2 may be performed in operation S514. As shown in FIG. 11, when the gain gap of the amplification gain calculated in operation S512 is greater than the second threshold value THR2, operation S516 may be performed thereafter; when the gain gap of the amplification gain is less than the second threshold value THR2, operation S520 in FIG. 10 may be subsequently performed.

An operation of determining that the simultaneous reception is impossible may be performed in operation S516. In operation 8514, when the gain gap between the amplification gains is determined as being greater than the second threshold value THR2, the impossibility of the simultaneous reception may be determined in advance, and performance of operations (S520, S540, and S560) shown in FIG. 10, in which whether the simultaneous reception is possible is determined based on the time gap between the frame boundaries, may be omitted.

Figure 12A:
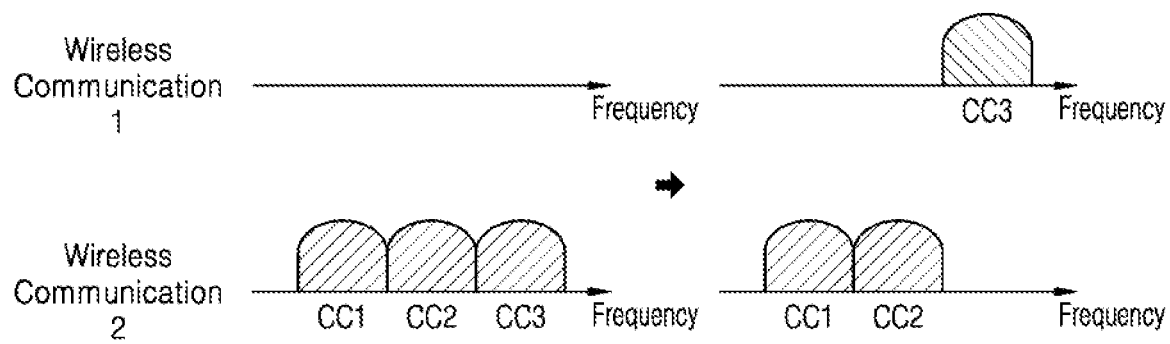
FIGS. 12A and 12B are timing diagrams illustrating respective examples of simultaneous reception, according to example embodiments of the inventive concept.
Figure 12B:
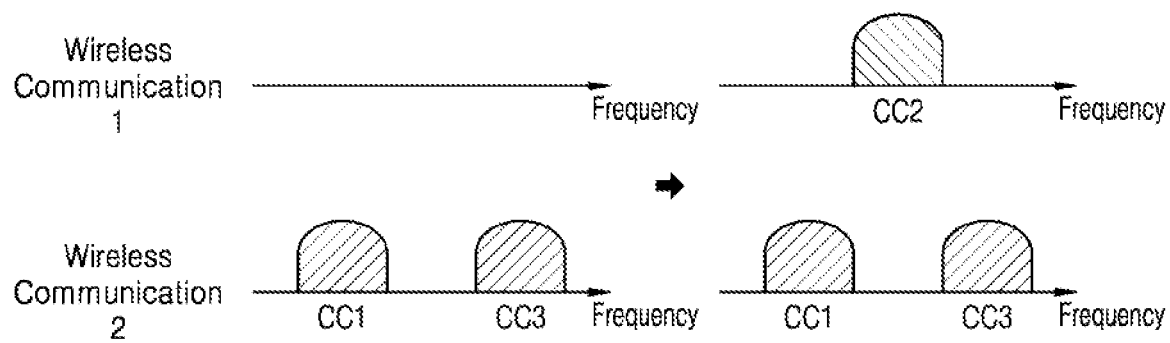

FIGS. 12A and 12B are timing diagrams illustrating examples of simultaneous reception, according to example embodiments of the inventive concept. More particularly, FIGS. 12A and 12B illustrate examples of simultaneously receiving the first wireless communication 11 and the second wireless communication 12 shown in FIG. 1 by using CA. For example, in operation S700 of FIG. 4, RF paths may be allocated to the first wireless communication 11 and the second wireless communication 12, as shown in FIGS. 12A and 12B. Hereinafter, FIGS. 12A and 12B will be described with reference to FIG. 1.

Referring to the left portion of FIG. 12A, the second wireless communication 12 may use CA including a first CC CC1, a second CC CC2, and a third CC CC3. Note that a "CC" herein may be refer to, and be illustrated as, a modulated carrier wave with a bandwidth centered about the carrier wave (the peaks of the envelopes shown in FIGS. 12A and 12B), where the bandwidth is due to the modulation. In FIG. 12A, the first CC CC1, the second CC CC2, and the third CC CC3 are illustrated as adjacent to one another (or consecutive). Since no carrier wave is shown to be allocated to the first wireless communication 11, this may correspond to a scenario where the SIM corresponding to the first wireless communication 11 is either disabled (e.g., by means of a user disabling it through a user interface, or a default setting). Alternatively, FIG. 12A may correspond to a scenario where the SIM corresponding to the first wireless communication 11 is disconnected from UE 100.

However, in some embodiments, as shown in FIG. 12B, the second wireless communication 12 may also use CA including CCs apart from (or discontinuous with) one another. In addition, in some embodiments, the second wireless communication 12 may use intra-band CA including CCs within one frequency band or inter-band CA including CCs within at least two frequency bands. The second wireless communication 12 may also use CA that includes less or more than three CCs.

In some embodiments, when it is determined that the first wireless communication 11 and the second wireless communication 12 conflict each other in operation S300 of FIG. 4 and it is determined that the wireless communications may be simultaneously received in operation S500, in operation S700, an operation of releasing at least one RF path from the plurality of RF paths (e.g., at least one of paths 122-1 to 122-n of FIG. 1) allocated to the second wireless communication 12 and allocating the at least one released RF path to the first wireless communication 11 may be performed. For example, as shown in the right portion of FIG. 12A, the third CC CC3 may be released from the second wireless communication 12 and when the first wireless communication 11 is in the idle state, the third CC CC3 may be allocated to the first paging. Accordingly, data received from the first wireless communication 11 (or the first paging) and the second wireless communication 12 may be simultaneously received by using CA.

Referring to the left portion of FIG. 12B, the second wireless communication 12 may use CA including a first component carrier CC1 and a third component carrier CC3. In some embodiments, when it is determined that the first wireless communication 11 and the second wireless communication 12 conflict each other in operation S300 of FIG. 4 and it is determined that the wireless communications may be simultaneously received in operation S500, an operation of adding at least one RF path different from at least one RF path allocated to the second wireless communication 12 and allocating the added at least one RF path to the wireless communication 11 may be performed in operation S700. For example, as shown in the right portion of FIG. 12, the first CC CC1 and the third CC CC3 are allocated to the second wireless communication 12, and the second CC CC2 may be allocated to the first wireless communication 11, for example, to the first paging when the first wireless communication 11 is in the idle state. Accordingly, similarly to FIG. 12A, data received from the first wireless communication 11 (or the first paging) and the second wireless communication 12 may be simultaneously received by using CA.

Figure 13:
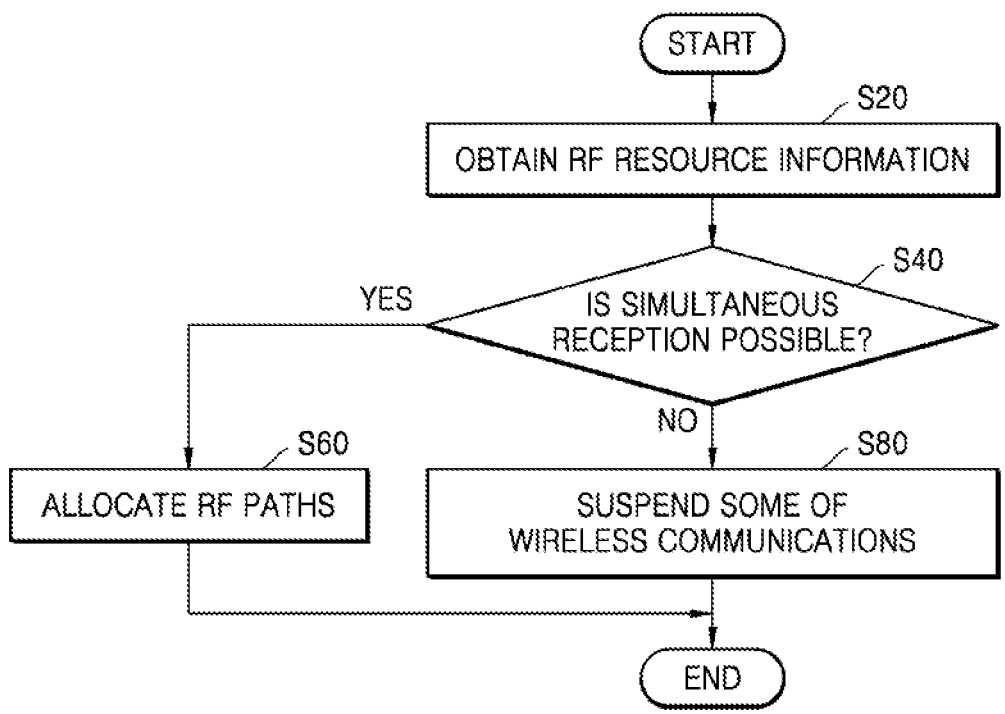
FIG. 13 is a flowchart describing a method of multi-SIM wireless communication according to an example embodiment of the inventive concept.

FIG. 13 is a flowchart describing a method of performing the multi-SIM wireless communication according to an example embodiment of the inventive concept. More particularly, compared to the method described with reference to FIG. 4, an operation of determining collision or non-collision between the plurality of wireless communications respectively associated with the plurality of SIMs may be omitted from the method described with reference to FIG. 13. For example, the method described in FIG. 13 may be performed by using the multi-SIM device 130 shown in FIG. 1, and hereinafter, FIG. 13 will be described with reference to FIG. 1. Among descriptions of FIG. 13, descriptions overlapping with those of FIG. 4 will be omitted.

An operation of obtaining RF resource information may be performed in operation S20. The RF resource information may include information regarding the RF resources, that is, the RF paths provided by the transceiver 120, and may, for example, include information regarding the configurations of CA and/or MC. In some embodiments, at least some of information regarding the RF paths may be provided from the transceiver 120 to the multi-SIM device 130, stored in an interior storage of the multi-SIM device 130, or stored in an exterior storage of the multi-SIM device 130.

In operation S40, an operation of determining whether the wireless communications may be simultaneously received may be performed. For example, the multi-SIM device 130 may determine whether the wireless communications may be simultaneously received based on the RF path information obtained in operation S20. Unlike the embodiment described in FIG. 4, the multi-SIM device 130 may determine whether the wireless communications may be simultaneously performed, regardless of collisions between the first wireless communication 11 and the second wireless communication 12. When at least one RF path may be allocated to the first wireless communication 11 and the second wireless communication 12, it may be determined that the wireless communications may be simultaneously received and, in operation S60, an operation of allocating RF paths to the first wireless communication 11 and the second wireless communication 12 may be subsequently performed. On the other hand, when the at least one RF path may not be allocated to one of the first wireless communication 11 and the second wireless communication 12, it may be determined that the wireless communications may not be simultaneously received, and an operation of retaining some of the wireless communications may be performed thereafter in operation S80.

Figure 14:
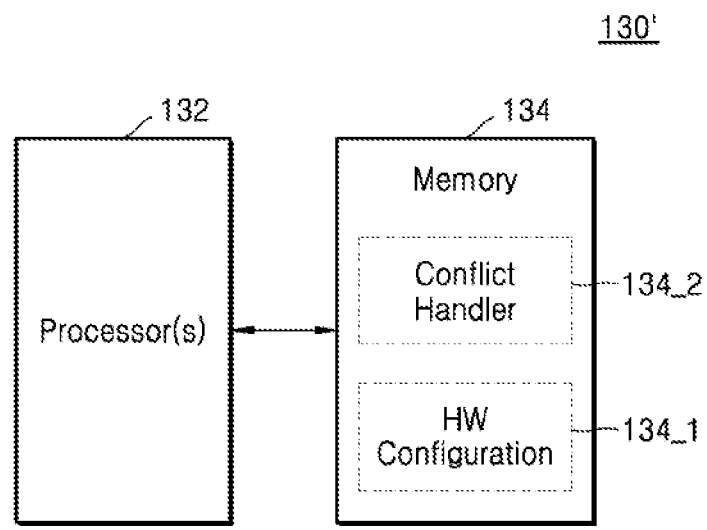
FIG. 14 is a block diagram illustrating an example of a multi-SIM device shown in FIG. 1, according to an example embodiment of the inventive concept.

FIG. 14 is a block diagram illustrating an example of a multi-SIM device shown in FIG. 1, according to an example embodiment of the inventive concept. As shown in FIG. 14, the multi-SIM device 130' may include at least one processor 132 and a memory 134, and the at least one processor 132 and the memory 134 may be communicatively connected to each other.

The at least one processor 132 may be at least one processing circuit (e.g. an integrated circuit) that may perform target operations by executing program code including instructions. The at least one processor 132 may refer to a hardware-implemented data processor including operations expressed as codes and/or instructions included in a program or including a physically structured circuit to execute target operations. In some embodiments, the hardware-implemented data processor may, as non-limited examples, include microprocessor, Central Processing Unit (CPU), processor core, multi-core processor, multi-processor, Application Processor (AP), Communication Processor (CP), Application Specific Integrated Circuit (ASIC), and Field Programmable Gate Array (FPGA). The memory 134 may be accessed by at least one processor 132 and may, as shown in FIG. 14, store a conflict handler 134_2 and a hardware configuration 134_1.

The memory 134 may, as non-limited examples, include any suitable type of memory to which the at least one processor 132 may access, for example, random access memory (RAM), read only memory (ROM), a tape, a magnetic disc, an optical disc, volatile memory, non-volatile memory and combinations thereof. In some embodiments, the conflict handler 134_2 and the hardware configuration 134_1 may respectively be stored in separate memory devices.

The at least one processor 132 may perform at least some of the operations of the multi-SIM device 130' described above with reference to the drawings, by executing the conflict handler 134_2 stored in the memory 134. For example, the at least one processor 132 may, by executing the conflict handler 134_2, establish windows corresponding to the wireless communications and predict collisions between the wireless communications, based on the established windows.

While the inventive concept has been particularly shown and described with reference to embodiments thereof, it will be understood that various changes in form and details may be made therein without departing from the spirit and scope of the following claims.

What is claimed is:

1. A method of multi-Subscriber Identify Module (SIM) wireless communication, the method performed within a wireless terminal including multiple SIMS and comprising:
    establishing a window for at least receiving paging in an idle state of a first wireless communication associated with a first SIM;
    predicting, based on the window, a collision or non-collision between the paging and a second wireless communication associated with a second SIM; and
    determining, in response to a collision prediction, whether a simultaneous reception of the paging and the second wireless communication is possible through use of different respective carriers, if so, allocating respective radio frequency (RF) paths to the paging and the second wireless communication, the allocated RF paths corresponding to the different respective carriers,
    wherein said determining whether the simultaneous reception is possible comprises determining that the simultaneous reception is impossible when a gain gap between respective amplification gains used in the first wireless communication and the second wireless communication is greater than a reference value.

2. The method of claim 1, wherein the window comprises a pre-processing period for configuring hardware to receive the paging, a reception period for receiving the paging, and a post-processing period for processing the received paging.

3. The method of claim 2, wherein the establishing of the window comprises:
    obtaining duration information regarding the pre-processing period, the reception period, and the post-processing period;
    obtaining timing information of the window; and
    defining the window, based on the duration information and the timing information of the window.

4. The method of claim 3, wherein the timing information of the window comprises a paging frame and a paging offset of the paging.

5. The method of claim 1, wherein the determining of whether the simultaneous reception is possible comprises:
    calculating a time gap between frame boundaries of the first wireless communication and the second wireless communication; and
    determining whether the simultaneous reception is possible based on configurations of carrier aggregation and/or multi-connectivity, when the time gap is less than or equal to a first reference value.

6. The method of claim 5, wherein the determining of whether the simultaneous reception is possible comprises determining whether the simultaneous reception is possible based on the configuration of the multi-connectivity, when the time gap is greater than the first reference value.

7. The method of claim 5, wherein the first reference value is a length of a cyclic prefix (CP).

8. The method of claim 1, wherein the window is a first window, the paging is a first paging, and the method further comprising establishing a second window for at least receiving second paging associated with the second SIM, and
    the prediction of the collision or non-collision comprises determining, when the second wireless communication is in the idle state, whether the first window and the second window overlap each other.

9. The method of claim 1, wherein the prediction of the collision or non-collision comprises determining, when the second wireless communication is in a connected state, whether the window overlaps a signal reception period in the second wireless communication.

10. The method of claim 1, wherein the window is a first window, and the method further comprising establishing, when the second wireless communication is in a Connected Discontinuous RX (CDRX) state, a second window for processing an on-duration associated with the second SIM, and
    the prediction of the collision or non-collision comprises determining, when the second wireless communication is in the CDRX state, whether the first window and the second window overlap each other.

11. The method of claim 1, further comprising suspending reception of a signal associated with the second wireless communication in the window, in response to determining that the simultaneous reception is impossible.

12. The method of claim 1, wherein the allocating of the respective RF paths to the paging and the second wireless communication comprises:
    releasing at least one RF path from a plurality of RF paths allocated to the second wireless communication and allocating the at least one released RF path to the paging.

13. The method of claim 1, wherein the allocating of the respective RF paths to the paging and the second wireless communication comprises activating at least one RF path different from at least one RF path allocated to the second wireless communication and allocating the activated at least one RF path to the paging.

14. A method of multi-Subscriber Identify Module (SIM) wireless communication, the method comprising:
    obtaining, by a multi-SIM device including first and second SIMs, radio frequency (RF) resource information regarding configurations of carrier aggregation and/or multi-connectivity; and
    determining, by the multi-SIM device based on the RF resource information, whether a simultaneous reception of a second wireless communication associated with the second SIM and a paging of a first wireless communication associated with the first SIM is possible through use of different respective carriers, if so, allocating respective RF paths to the paging and the second wireless communication, the allocated RF paths corresponding to different respective carriers,
    wherein said determining of whether the simultaneous reception is possible comprises:
    calculating a time gap between frame boundaries of the first wireless communication and the second wireless communication; and
    determining whether the simultaneous reception is possible based on configurations of carrier aggregation and/or multi-connectivity, when the time gap is less than or equal to a length of a cyclic prefix.

15. The method of claim 14, further comprising:
    establishing, by the multi-SIM device a window for receiving and processing the paging; and predicting, by the multi-SIM device based on the window, a collision or non-collision between the paging and the second wireless communication, wherein the determining of whether the simultaneous reception is possible is performed in response to a collision determination.

16. A user equipment supporting Multi-SIM Multi-Standby (MSMS), the user equipment comprising:
a first Subscriber Identify Module (SIM) and a second SIM;
a transceiver configured to form a plurality of radio frequency (RF) paths corresponding to a plurality of carrier waves, respectively; and
a multi-SIM device connected to the transceiver, the first SIM, and the second SIM, the multi-SIM device comprising a processor configured to execute instructions to:
determine whether a simultaneous reception of a second wireless communication associated with the second SIM and paging of a first wireless communication associated with the first SIM is possible though use of different respective ones of the plurality of carrier waves; and
allocate, in response to determining that the simultaneous reception is possible, at least one RF path from among the plurality of RF paths to each of the paging and the second wireless communication,
wherein the instructions to determine whether the simultaneous reception is possible comprise instructions to determine that the simultaneous reception is impossible when a gain gap between respective amplification gains used in the first wireless communication and the second wireless communication is greater than a reference value.

17. The user equipment of claim 16,
wherein the multi-SIM device is further configured to perform:
establish a window for receiving and processing the paging; and
determine, based on the window, a collision or non-collision between the paging and the second wireless communication,
wherein the determination of whether the simultaneous reception is possible is performed in response to a collision determination.

18. The user equipment of claim 17,
wherein the window comprises a pre-processing period for setting hardware to receive the paging, a reception period for receiving the paging, and a post-processing period for processing the received paging, and
the multi-SIM device is configured to determine a duration of the window, by obtaining information regarding the RF resources and determining the pre-processing period, the reception period, and the post-processing period based on the obtained information.

19. The user equipment of claim 16,
wherein the transceiver is configured to form the plurality of RF paths based on carrier aggregation and/or multi-connectivity.

* * * * *